United States Patent [19]

Bell

[11] Patent Number: 4,898,424
[45] Date of Patent: Feb. 6, 1990

[54] LINEAR SEAT RECLINER

[75] Inventor: Robert L. Bell, Rochester Hills, N.Y.

[73] Assignee: Fisher Dynamics Corporation, St. Clair Shores, Mich.

[21] Appl. No.: 216,618

[22] Filed: Jul. 8, 1988

[51] Int. Cl.[4] .............................................. A47C 1/024
[52] U.S. Cl. .................................... 297/367; 297/363; 297/375
[58] Field of Search ............... 297/391, 399, 374, 367, 297/366, 368, 372, 375, 363; 292/266, 265; 188/83, 109

[56] References Cited

U.S. PATENT DOCUMENTS

| 535,999 | 3/1895 | Sargent | 297/375 |
|---|---|---|---|
| 2,066,901 | 1/1937 | Preble | 297/363 X |
| 2,745,471 | 5/1956 | Chappuis | 297/374 |
| 3,001,821 | 9/1961 | Marechal | 297/366 |
| 3,133,764 | 5/1964 | Naef | 297/367 |
| 3,870,269 | 3/1975 | Werner et al. | 248/394 |
| 4,243,264 | 1/1981 | Bell | 297/367 |
| 4,245,866 | 1/1981 | Bell et al. | 297/365 |
| 4,279,442 | 7/1981 | Bell | 297/367 |
| 4,372,610 | 2/1983 | Bell | 297/367 |
| 4,705,319 | 11/1987 | Bell | 297/362 |

Primary Examiner—James T. McCall
Attorney, Agent, or Firm—Harness, Dickey & Pierce

[57] ABSTRACT

A spring loaded latch mechanism for controlling tilting movement of a seat back relative to a seat frame to which it is pivoted, includes an elongated rod having one toothed face and only one end connected to the seat, a latch frame connected to the seat and supporting the other end of the rod for reciprocation therewithin, a pawl adapted to releasably engage the teeth, a manually-operated handle, and a cam interconnecting the handle and the pawl to drive the pawl into and from engagement. In one embodiment similar latch mechanisms are provided, one on each side of the seat with the mechanism opposite to the handle being a slave having a free-floating cam plate and a lever plate driven by the operator, actuation of the slave cam plate resulting from the lever plate being rotated thereagainst independently of the master latch mechanism on the handle side.

38 Claims, 6 Drawing Sheets

LINEAR SEAT RECLINER

BACKGROUND AND SUMMARY OF THE INVENTION

This invention relates to a linear seat recliner and, in particular, to a manually-operated latch mechanism for retaining a reclinable back of a vehicle seat in a desired position.

U.S. Pat. No. 4,245,866, issued Jan. 20, 1981, discloses a latch mechanism having a pair of toothed latches which are manually operated to engage/disengage, respectively, with teeth on opposite faces of a slidable link pivotally connected at its opposite ends to a vehicle seat and a seat back, the seat portions being joined and supported for rotation by a pivot pin and the teeth providing stepped changes in adjusted angular position. While suitable for the purposes intended, demands of the automobile industry require improvement of such latch mechanisms to render them more positive, more accessible, lighter and less expensive.

Oftentimes, depending on the seat structure, locking at opposite lateral sides of the seat would be desirable. In a bench seat tremendous torques can be placed on the latch mechanism when reclining pressure is placed on the seat back. Spaced latch mechanisms would allow the seat frame to form part of a latch frame and reduce the seat frame dimensions without impairing load carrying ability. In such locking the latch mechanisms should be synchronized to lock positively and provide an adjustability characterized in that when one side is adjusted to its desired location, the other side, will be free floating to fit in ratchet-like fashion to the next tooth that is leading or lagging. Because of a desire for simple structure, the structure should be manually operable.

In an adjustable seat structure, a back section is pivoted to a seat section and a tilt-adjusting mechanism for controlling rotation of the back to a reclining position relative to the seat. In accordance with this invention, the tilt-adjusting mechanism is characterized by an elongated rod having opposite end portions and teeth on only one face thereof, one end portion of the rod being connectable to the back at a pivot point spaced from the axis of rotation, and a latch mechanism connected to said seat for latching the rod, the latch mechanism supporting the other end portion of the rod for reciprocating movement relative to the mechanism. The latch mechanism includes first bias means for biasing the rod into a first direction to direct the seat back into an upright position, a pawl having a tooth engageable with the teeth on the rod to retain the back at a desired tilt, release means to release the pawl from engagement, including a manual operator responsive to manual pressure, a cam plate driven in response to said operator, and a pin captivated within a cam slot, one and the other of the pin and the slot, respectively, being associated with the pawl and the cam plate and second bias means for biasing the cam plate, whereby the pawl is driven into engagement with the rod.

In a further embodiment in accordance with this invention, a pivot rod extends between a master and a slave latch mechanism and the manual operator controls rotation of the pivot rod, each latch mechanism being operated by the manual operator at only one side of the seat. In this embodiment the pivot rod simultaneously drives the cam plate in the master and a lever plate in the slave, the lever plate being driven against its cam plate.

Operation of the manual operator in a release direction overcomes the second bias means whereby the pivot rod directly drives, respectively, the master cam plate against its associated pawl and the slave lever plate against its cam plate and associated pawl, simultaneously releasing the pawls from engagement with their seat adjustment rods. Release of pressure on the operator directly drives, respectively, the master cam plate and slave lever plate back to their original position, the master cam plate driving its pawl back into engagement with its rod. The second bias means in the slave drives the cam plate therein towards the lever plate whereby the slave pawl is driven back into engagement with its respective rod. If the seat has been pivoted, the first bias means drive the rods back to their first position representing the seat up position. Importantly, direct movement of the operator in the engaging direction assures that once the master pawl has gripped its rod, the free-floating slave pawl will also grip its rod, engaging with the first adjacent tooth.

Advantageously, such a tilt-adjusting mechanism permits a conventional seat frame support to be simplified and made less "robust" as the recliner mechanism provides part of the support.

Provision of a floating or slave drive plate assures that positive synchronized locking will be achieved in operation.

A further advantage of a two-sided tilt-adjusting mechanism is that straight line loading, as opposed to offset loading in the mechanism is achieved, thereby requiring less strength in the unit.

Because of the general commonality of parts found in the master and slave units, the number of different parts is reduced, thus less expensive.

Further, because of a similarity of structure in the latch mechanism, the drive shaft may be made of any desired length to permit use on seats having different widths.

BRIEF DESCRIPTION OF THE DRAWINGS

FIG. 3 is an exploded perspective view of the master latch mechanism shown in FIG. 2;

FIGS. 5 and 6 are partial section views of the master latch mechanism when in the seat back up and seat back reclined positions; and FIGS. 7 and 8 are partial section views of the slave latch mechanism when in the seat back up and seat back reclined positions.

DETAILED DESCRIPTION OF THE PREFERRED EMBODIMENT

Figure 1:
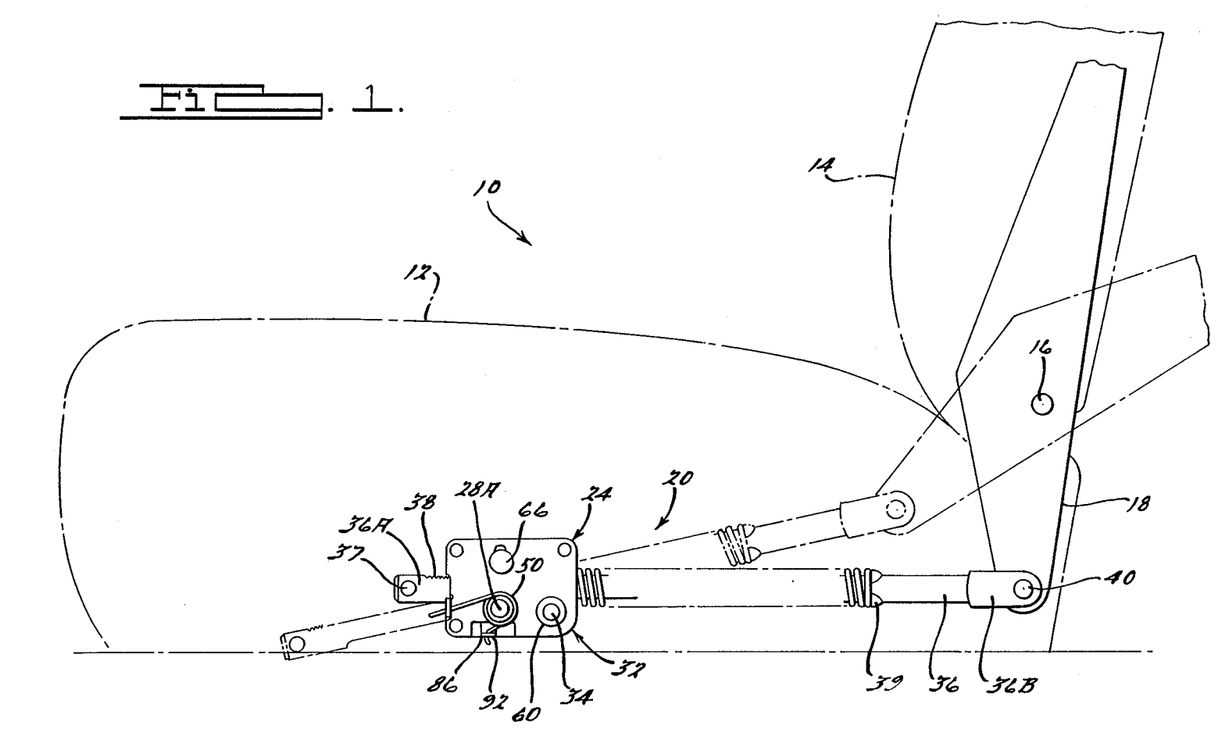
FIG. 1 is a side elevational view of a vehicle seat embodying the instant invention, such as would be seen on the driver side of a vehicle.

Referring now to the drawings, FIG. 1 shows, in schematic fashion, a vehicle seat back assembly 10 incorporating a seat tilt-adjusting mechanism in accordance with the present invention. The seat assembly is of the type conventionally formed in the front seat of motor vehicles and comprises a seat recliner mechanism for supporting a seat cushion 12 and a seat back 14 which permits the angle therebetween to be controllably varied. The seat back is supported for pivotal movement relative to the seat cushion on a lower recliner structure (not shown) as by a pin 16 so as to permit the seat back, supported on an upper recliner structure 18, to be pivoted to a desired reclining position. The upper and lower reclining structures are typically fabricated of metal plates suitably configured to receive the latch mechanism and would employ components which are mirror images of one another at their opposite lateral sides.

Figure 2:
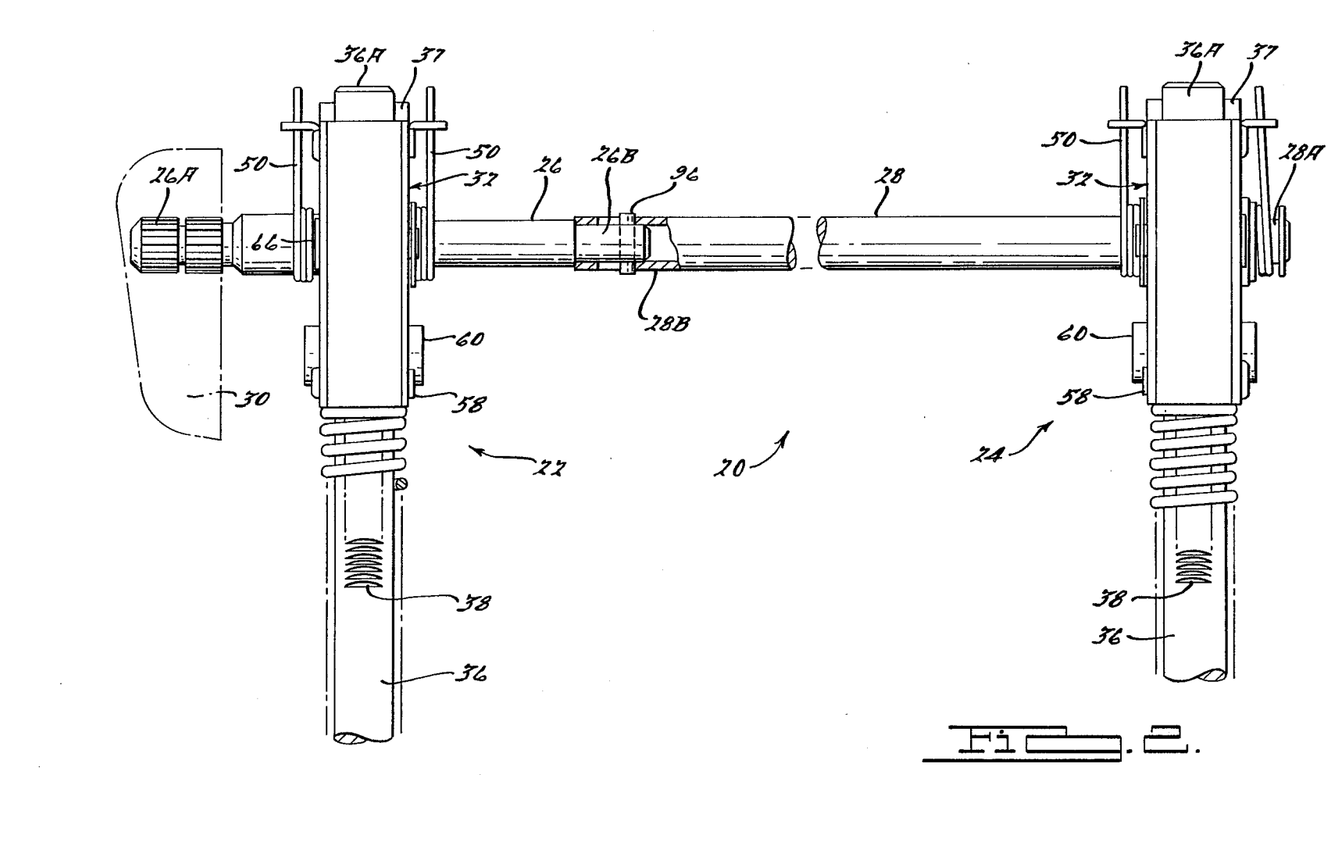
FIG. 2 is a plan view looking downwardly at a manually-operated tilt-adjusting mechanism, including a master and a slave latch mechanism, for controlling the inclination of the seat back relative to the vehicle seat shown in FIG. 1.

The seat back tilt-adjusting mechanism, generally indicated by reference number 20, is provided for controlling reclining movement of the seat back relative to the seat cushion. The tilt-adjusting mechanism preferably includes a master latch mechanism 22, a slave latch mechanism 24, and pivot rods 26 and 28, having adjacent ends 26B and 28B nonrotatably connected, for transferring torques from the master latch mechanism to the slave latch mechanism. As shown in FIG. 2 master latch mechanism 22 has a manual operator, indicated by handle 30, positioned for use by the right hand of the driver and connected so as to operate pivot rod 26. Rod end 26A is splined to nonrotatably engage handle 30. If a seat for the driver and a seat for the passenger were included, each would have a tilt-adjusting mechanism with the master latch mechanism typically being located so that manual operator handle 30 is positioned for use by the right hand of the passenger. However, because of commonality of parts and design, as described herein, it will be appreciated that the latch mechanisms and manually-operated handle could be positioned for use by either hand of the driver or passenger. Further, in some seats, only a single releasable latch mechanism may be needed.

Each latch mechanism 22 and 24 includes a latch frame 32 pivotally connected by a pin 34 to the vehicle and an elongated recliner rod 36 having teeth 38 on only one surface thereof, each rod having one end portion 36A journalled for reciprocation relative to its latch frame and its other end portion 36B pivotally connected to the seat bracket by a pin 40. Actuation of manual operator 30 causes respective cam plates 42 and 44 to force a toothed pawl 46 in each latch mechanism to release or engage with respective teeth 38 on its rod 36. Force placed on seat back 14, such as by the body of the driver, causes same to transmit forces to the rod, whereupon the rod will slide in a direction opposite to that placed on the seat, whereby the seat back rotates to assume a desired reclining position. As shown by phantom lines for structure 18 in FIG. 1 seat back 14 has been tilted back relative to pivot 16 as indicated by rod 36 being pivoted such that its axis is at an acute angle relative to its original horizontal position.

As will be discussed herein, the difference between the master and slave latch mechanism is that pivot rods 26 and 28 are nonrotatably interconnected to cam plates 42 in the master and to lever plates 48 in the slave, the lever plates allowing pawl 46 and cam plate 44 in the slave to be free floating. Torsion springs 50 in each latch frame normally bias cam plates 42 and 44 back into their original position so as to drive the pawls thereof into engagement with teeth 38 on its toothed rod. However, because cam plate 44 in the slave is not directly keyed to rotate with the manual operator, when operator 30 drives cam plate 42 and lever plate 48 in the master back to its original position, torsion spring 50 in the slave drives the cam plate 44 back towards the lever plate whereby the pawl therein is driven back into engagement with the first available tooth 38 on its rod 36. Because of the width of a bench seat the respective teeth 38 on the rods 36 will not normally be identically located and the independent engagement of the slave pawl allows sure locking fitment.

Turning first to the master latch mechanism 22, latch frame 32 comprises a generally rectangular housing that includes a pair of metal side plates 52 each having a flange 54 upstanding therefrom, a pair of polymeric spacers 56 and rivets 58 and 60. The plates and spacers include an array of corresponding cylindrical apertures 62 and 64 sized to receive the rivets 58 and 60 and corresponding squared ovals sized to receive a pawl pivot pin 66, the squared ovals defining a vertically extending cam slot 68. Each rivet 58 passes through the apertures 62 to secure the spacers and side plates firmly together. Rivet 60 passes through the apertures 64 and is a mounting tube for receiving pin 34 to rotatably mount the mechanism to the seat frame. Each spacer 56 has a first and second face and respective first and second recesses, the first faces being abutted whereby the first recesses are in superposing relation to define a generally T-shaped cavity 70, including a pair of vertical sidewalls that define a channel for receiving the pawl. Each side plate 52 abuts one respective second face whereby the second recesses define a generally pie-shaped cavity 72 having radial sidewalls 72A and 72B and which receives one cam plate. A bore 74 is defined through the side plates and spacers by respective apertures therein being aligned, the bore being sized to receive pivot rod 26, to be described.

The free end portion 36A of each recliner rod includes a retention pin 37 which prevents its rearward withdrawal from the latch frame and a pair of abutment shoulders 39 proximate its pivoted end portion 36B to shoulder one end of a coil spring 76, the other end of the spring abutting latch frame. Coil spring 76 inhibits axial movement of shoulders 39 towards latch frame 32, but yields to forces transmitted thereto by the user rotating the seat back. The rod 36 has a length of its top surface provided with teeth 38 to be engaged by teeth 78 on pawl 46.

Cam plate 42 is pie-shaped, generally flat, and includes a squared oval opening at its narrowed apex to define a keyway 80, an arcuate slot 82 defining a cam follower surface 84 and a notched spring retainer flange 86 extending upwardly therefrom so as to extend outwardly of the side plate it confronts. Camp plate 42 is adapted to rotate between sidewalls 72A and 72B defined by the cavity 72 into which it is fit. The cam follower surface 84 has arcuate first and second portions spaced radially outward from keyway 80 to engage and thereby drive pawl pivot pin 66.

The pawl 46 is generally T-shaped to define a head and a body portion, the head having teeth 78 to engage rod teeth 38 and the body portion being adapted to reciprocate in the channel in a vertical plane relative to its recliner rod. A cylindrical aperture 88 in its body portion is aligned with the oval-shaped cam slot 68 and is sized to receive pawl pivot pin 66.

Pivot rod 26 has a flat 27 and extends through bore 74, the cross section of the rod defining a key which nonrotatably fits the keyways 80 of cam plates 42 to constrain rotation of the cam plates. The pivot rod 26 has opposite end portions 26A and 26B each respective end portion extending outwardly from one respective side plate, end portion 26A extending away from the seat and being connected to manually-operated handle 30 and end portion 26B extending towards the seat.

A coiled torsion spring 50 is adjacent each side plate and fits about pivot rod 26, each torsion spring having one end 50A abutting a respective side plate flange 54 and its other end 50B being received in a notch of the cam plate spring retainer flange 86, the torsion springs inhibiting rotation of the respective cam plates 42.

Pawl pivot pin 66, of circular cross section, extends through aperture 88 in pawl 46, and through the squared cam slots 68 formed in side plates 52 and spacers 56. Cam slot 68 constrains pawl pivot pin 66, and thus the pawl, for vertical movement relative to its latch frame as a result of rotation of the cam plates 42 by the pivot rod 26. Pivot pin 66 fits within the arcuate slot 82 and is engaged by cam follower surface 84, rotation of the cam plates 42 causing the follower surfaces to drive the pin vertically relative to cam slot, whereby the pawl teeth are removed from engagement with teeth 38 on rod 36.

Figure 4:
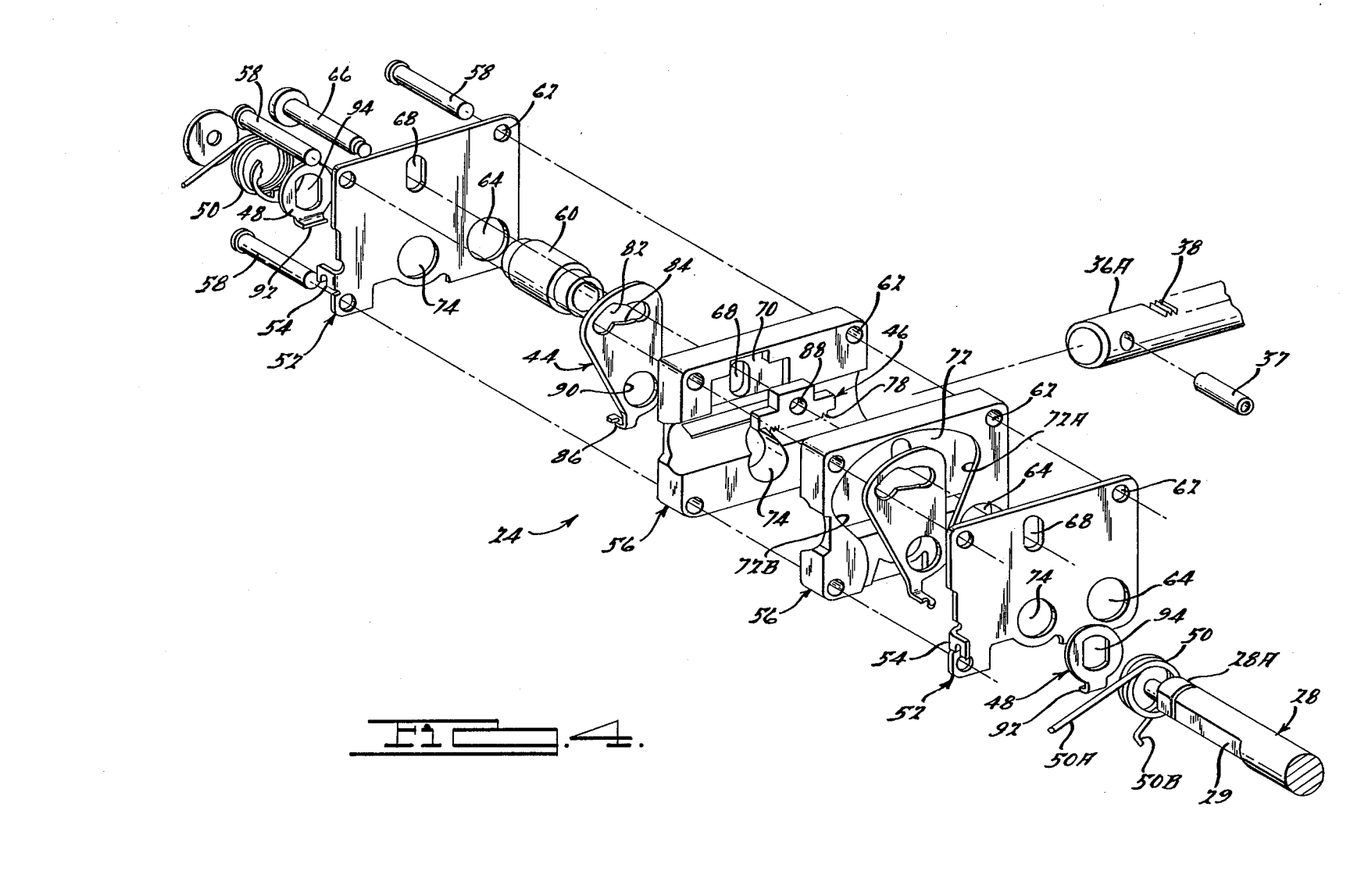
FIG. 4 is an exploded perspective view of the slave latch mechanism shown in FIG. 2.

Slave latch mechanism 24 is similar to master latch frame mechanism 22 and includes the latch frame 32, comprising a pair of spacers 56, a pair of side plates 52 each with a flange 54, a pawl 46, a pair of cam plates 44, a pair of torsion springs 50, pivot rod 28 and associated cavities 70 and 72 for captivating pawl 46 and cam plates 44. However, in the slave latch mechanism the cam plates 44 have a circular opening 90 to receive pivot rod 28 and be free floating thereto, each cam plate 44 being driven by a respective release lever plate 48 nonrotatably keyed by pivot rod 28 to rotate with the manual operator 30, each lever plate 48 having an actuator flange 92 upstanding therefrom. Each lever plate has a squared oval aperture to define a keyway 94 which registers with and passes pivot rod 28 having a flat 29 to define a cross section of like shape to define a key, aperture 90 in the cam plates 44 being circular whereby each cam plate 44 is free to rotate relative to pivot rod 28. Each respective torsion spring 50 has one end 50A abutting its side plate flange 54 and its other end 50B abutting flange 86 on cam plate 44. Rotation of the lever plate 48 is directly caused by rotation of pivot rod 28, whereby actuator flanges 92 rotate against the respective cam plate spring retaining flanges 86, thereby rotating cam plates 44. Rotation of the cam plates changes the position of the cam follower surfaces 84 so as to drive pawl 40 from engagement with its rod 30.

Pivot rods 26 and 28 extend from their latch frames to have respective ends 26B and 28B connected together whereby to transfer torques from the manual operator handle 30, the torque being transmitted by pin 26 to cam plates 42 in the master latch frame and by pin 28 to lever plates 48 in the slave latch frame. As shown best in FIG. 2, rod end 26B fits within a hollow formed in rod end 28B, the rod end portions nonrotatably held together by retention pin 96. Advantageously, the rods may be changed at will to accommodate different seat widths and vehicle models. Further end 26B is smaller than end 28B to compensate for tolerances and misalignment.

Each of the rods and springs and associated components is retained relative to latch frames 32 by appropriate washers and retaining rings being fitted to the pivot rods.

Torsion springs 50, because of their connection between cam plate flanges 86 and lever plate flanges 92, and associated latch frame flanges 54, normally tend to cause rods 26 and 28 to be rotated back into the pawl engaging position. Inadvertent release of handle 30 will thus lock the seat back.

FIG. 2 shows the tilt arrangement for the vehicle seat assembly including the master latch mechanism, the slave latch mechanism, the manually-operated handle, the pivot rods and the torsion rod operably connecting the two latch mechanisms together. The handle is operated by the driver's right hand.

In one embodiment, side plates 52, cam plates 42 and 44, pawl 46, lever plates 48, and pivot pins 26 and 28 were comprised of a rust inhibiting steel. Spacers 54 were of acetal. The distance between frame mounting pin 34 of latch frame 32 and seat pivoting pin 16 of recliner rod 36 was about 183.36 mm. when reclining, 220.5 mm. at design extension and 236.83 mm. when full forward. Cam plates 42 and 44 subtended an angle of about 27° and cam slot 82 about 19° with radial sidewalls 72A and 72B of its cavity 72 being about 58°-66°, preferably about 65°. The teeth 38 and 78 were of the buttress-type (e.g., essentially right angle triangle cross section) to increase toothed engagement whereby to enhance wanted tilting in the seat reclining direction but resist spring forces on recliner rod which would tend to drive the seat back into an upright position.

Figure 5:
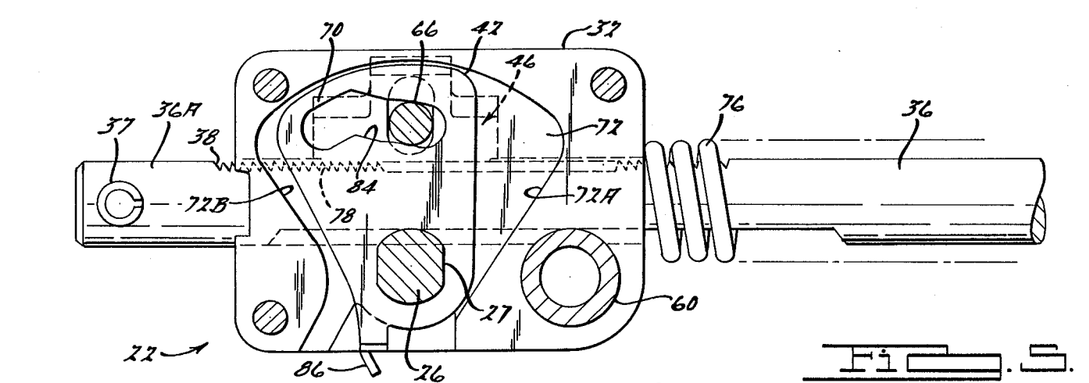
Figure 7:
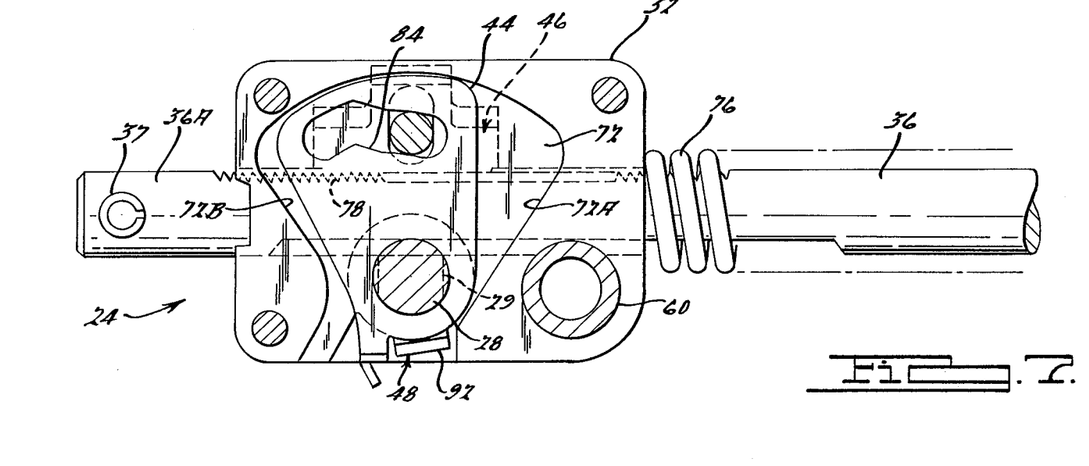
Figure 11:
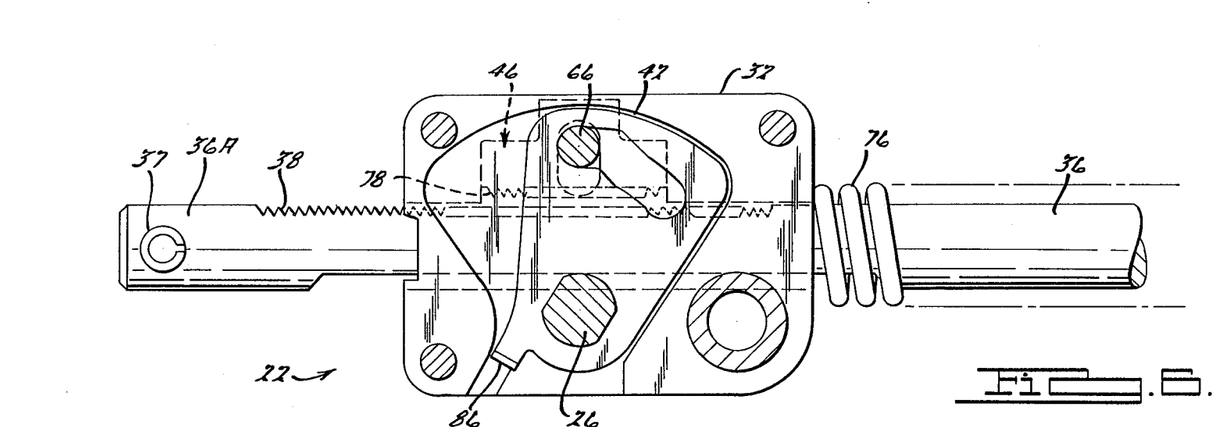
Figure 12:
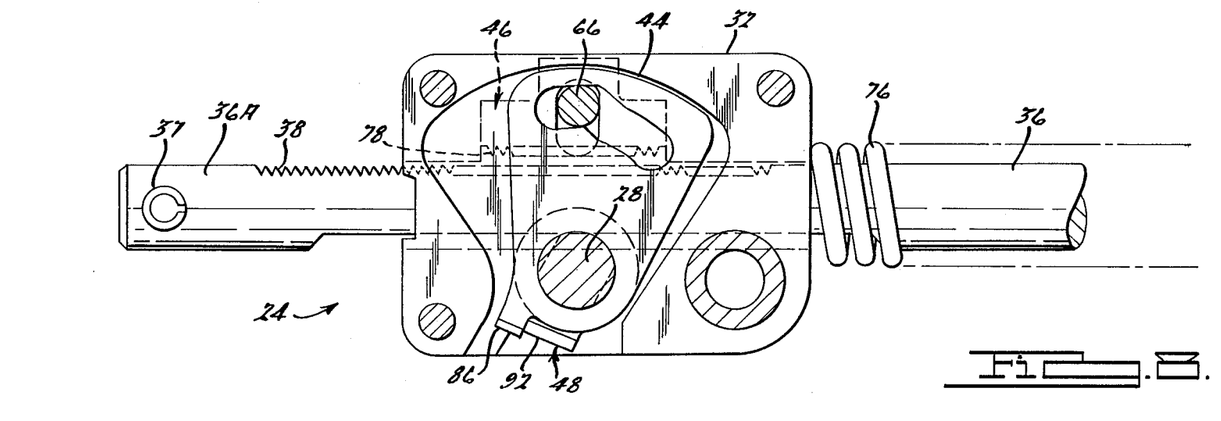

In operation, the handle 30 is rotated against torsion springs 50 thereby transmitting rotational torques to the pivot rod 26 nonrotatably keyed to the cam plates 42 in the master latch frame 22, and pivot rod 28 nonrotatably keyed to the lever plates 48 in the slave latch frame 24, rotation of lever plate 48 driving flange 92 against its cam plate flanges 86. As a result, the cam plates 42 and 44 are rotated, the torsion springs 50 are compressed, and cam follower surfaces 84 force pawl pivot pins 66 to move vertically relative to cam slot 68, whereby the pawls 46 and the pawl teeth 78 are lifted from engagement with teeth 38 on the respective recliner rods 36, allowing the rods to axially reciprocate relative to their latch frames 32. Force on the upper recliner structure causes coil springs 76 to compress and the seat back to tilt.

To hold the seat in the tilted positions, handle 30 is rotated back towards its original position. This rotation directly drives cam plates 42, and thus its pawl, and lever plates 48 back into their original position. Cam plates 42 directly force the master pawl 46 into locked engagement with its rod 36. The torsion springs 50 drive cam plates 44, and thus its associated pawl, back towards flanges 92 of lever plates 48 and into engagement with its rod. The pawl in the master latch frame 22 will engage with its rod first. Because the pivot rods 26 and 28 force lever plates 48 to rotate with handle 30, they return to their "initial" position simultaneously with the pawl in the master latch mechanism independently of the pawl 40 in the slave latch mechanism 24. However, cam plates 44, which drive the slave pawl, are biased by their torsion spring 50 towards the lever plate, thereby rotating cam plates 44 and cam follower slots. As a result, the pawl in the slave is driven into engagement with the first available tooth on its recliner rod.

While the above description constitutes the preferred embodiment of the invention, it will be appreciated that the invention is susceptible to modification, variation, and change without departing from the proper scope or fair meaning of the accompanying claims.

What I claim is:

1. In an adjustable seat structure, a back section pivoted to a seat section and a tilt-adjusting mechanism for controlling rotation of the back to a reclining position relative to the seat, said tilt-adjusting mechanism being responsive to manual pressure applied by an operator connected thereto and characterized by:

an elongated rod having first and second end portions with said first end having a length of teeth along its top surface, said second end portion being connectable to the back at a pivot point spaced from the axis of rotation, and a latch mechanism receiving the first end portion of said rod and connected to said seat for latching the rod, said latch mechanism supporting said rod for reciprocating movement relative to said structure and including first bias means for biasing said rod into a first direction to direct the seat back into an upright position, a latch member, including a tooth complementary to and engageable with the teeth on said rod, for latching the rod when the back is at a desired tilt, a cam plate for camming the latch member between a latched and unlatched position, said plate being rotatably mounted to the mechanism and driven in response to pressure applied by the operator, connection means for connecting the cam plate and the latch member, and second bias means for biasing the cam plate into the latched position with said rod.

2. The seat structure as recited in claim 1 wherein said connection means includes a pin captivated within a slot such that the cam plate is connected to the latch member, one and the other said pin and slot, respectively, being associated with the latch member and cam plate.

3. The seat structure as recited in claim 1 wherein said cam plate rotates in a vertical plane passing through the latch mechanism.

4. The seat structure as recited in claim 2 wherein said slot is in said cam plate and receives said pin extending from said latch member.

5. The seat structure as recited in claim 2 wherein said latch mechanism comprises a housing including a first cavity sized to receive said cam plate, said latch member being spaced therefrom.

6. The seat structure as recited in claim 5 wherein said housing includes a second cavity to receive the latch member.

7. The seat structure as recited in claim 6 wherein said housing includes a pair of spacers each spacer having a first and second face each having a recess, and a pair of side plates, the first faces being abutted whereby the recesses are superposed to form the second cavity, the side plates abutting a respective second face to form a pair of first cavities one for receiving the cam.

8. The seat structure as recited in claim 7 wherein said housing includes a pair of cam plates each received in a respective first cavity, each cam plate having said slot, and said pin extends through said latch mechanism and said slots.

9. The seat structure as recited in claim 1 wherein said latch mechanism comprises a pair of rotating cam plates a respective cam slot of each being aligned, each plate being mounted for rotation about an axis extending through the operator, said latch member is disposed between said cam plates and is connected to said plates by a pin extending into each respective slot, rotation of said plates causing said latch member to move in a plane perpendicular to said axis.

10. The seat structure as recited in claim 6 wherein said cam plate and first cavity are generally V-shaped and each has a keyway adjacent to the narrowed end for receiving an operating key extending from and constrained to rotate with the manual operator.

11. The seat structure as recited in claim 5 wherein the cavity is defined by a pair of radial sidewalls each extending from the narrowed end thereof, the cam plate being adapted to rotate between the sidewalls.

12. The seat structure as recited in claim 1 wherein said rod includes a shoulder proximate the first end portion thereof and said first bias means comprises an elongated coil spring extending along the rod and having one end engaging the latch mechanism and its other end engaging said abutment shoulder.

13. The seat structure as recited in claim 12 wherein said elongated coil spring encircles said elongated rod.

14. The seat structure as recited in claim 5 wherein said latch member is generally flat, T-shaped, and includes a head and a body with the head including a plurality of teeth, and said housing includes a T-shaped second cavity sized to receive said latch member and constrain same into vertical movement relative to axial motion of the rod.

15. The seat structure as recited in claim 10 wherein said second bias means comprises a torsion spring disposed about said key and having one and the other of its ends engaging the cam plate and said latch mechanism, said torsion spring resisting rotational movement of said cam plate when said key is rotated.

16. The seat structure as recited in claim 1 wherein said tilt-adjusting mechanism includes a pair of parallel, spaced apart elongated rods each having its one end portion connectable to the seat back at a respective pivot point spaced from the axis of rotation, a second latch mechanism receiving the second rod, and means connecting the two latch mechanisms for transmitting torque from the first latch mechanism to the second latch mechanism, said torque being applied by the manual operator to the first latch mechanism.

17. The seat structure as recited in claim 16 wherein said second latch mechanism further includes a lever plate connected to said manual operator and a second cam plate associated with a latch member, the other cam plate and lever plate being simultaneously driven by said operator, said second bias means driving said second cam plate towards the lever plate, the second cam plate being rotatable independently of the operator.

18. A spring loaded latch mechanism for controlling tilting movement of a seat back relative to a seat frame to which it is pivoted, comprising a rod having one end pivotally connected to the seat back and its other end provided with teeth along its top surface and adapted to reciprocate in a generally horizontal plane, a latch frame connected to the seat frame and supporting the reciprocating end of the rod, a toothed rack disposed in the latch frame and adapted to move in a vertical plane from first and second positions wherein the teeth are engaging and not engaging, a cam plate operably connected to the rack, first bias means connected to the cam plate for biasing said rack into interengagement with said rod, second bias means connected to said rod and latch frame for normally biasing said rod into a seat up position, and a manually-operated handle connected to the cam plate to drive the rack from its engagement with said rod.

19. The latch mechanism as recited in claim 18 wherein a pin from the latch member is received in a slot of the cam plate to move the latch member from engagement.

20. The latch mechanism as recited in claim 19 wherein said cam plate is constrained by a pivot pin to rotate with the handle.

21. The latch mechanism as recited in claim 20 wherein a pair of similar latch mechanisms are provided, one on each side of the seat with the latch mechanism on the seat side spaced from the handle including a lever plate constrained to rotate with the handle and a free-floating cam plate, rotation of the lever plate driving said free-floating cam plate into said second position and the rack associated therewith from engagement with its rod, release of pressure on the handle resulting in the rack associated with the free-floating cam to engage its rod independently of the other cam plate.

22. A latch mechanism for variably controlling tilting rotation of a seat back to a reclining position relative to a seat cushion, comprising a lower recliner structure supporting said cushion and having a pair of lateral sides, an upper recliner structure supporting said seat back, a first pivot rotatably attaching said lower recliner structure to said upper recliner structure and pivoting the back relative to a lateral axis extending between the sides, characterized by a pair of latch frames each cooperating to secure the seat back at a desired position and connectable, respectively, at one lateral side, and manually-operated torque transmitting means for transmitting torque to said frames, each said latch frame supporting an elongated rod for reciprocating movement in a first direction transversely of said axis, one and the other end portion of the rod, respectively, being connected to the seat back at a second pivot spaced from the first pivot and free, means for biasing the rod into a first position wherein the seat back is vertically disposed, engagement means including a latch member biased into engagement with said rod for releasably engaging said rod to prevent its movement, and releasing means for disengaging said latch member, including a pivoting cam plate, and a slot and a pin, respectively, from said latch member and cam plate interengaging, and said torque transmitting means including a drive shaft connecting the cam plates and a drive plate, one cam plate being driven by said shaft and the other cam plate being driven by said drive plate.

23. A latch frame for latching a seat adjusting rod used to control tilt of a seat back relative to a seat cushion in seat structure, the rod being toothed and having one end thereof being pivotally mounted by a first pin to the seat back and the other end thereof being adjacent the seat cushion, characterized by an oblong housing adapted to be pivotably mounted and vertically disposed adjacent the cushion, said housing including an elongated passage for journalling the rod for reciprocation therewithin, a first and second cavity, a keyway extending transversely of said passage, and an aperture, a manually operated pivot pin mounted for rotation in said aperture, a cam disposed within said first cavity and constrained to rotate with said pivot pin, said cam having a cam surface which moves in a plane generally parallel to said rod and between first and second positions, a toothed pawl having a hollow and mounted for vertical reciprocation within the second cavity, a cam pin engaging said surface and seated in said hollow for driving the pawl in response to said cam, the first and second positions, respectively, representing positions wherein the pawl is engaged and disengaged with the rod, and bias means connecting the housing to the cam for biasing the cam into the first position.

24. In an adjustable seat structure, a seat back pivoted to a seat and a tilt-adjusting mechanism for controlling rotation of the seat back to a reclining position relative to the seat, said tilt-adjusting mechanism being responsive to manual pressure applied by an operator connected thereto and characterized by:

a first elongated rod having first and second end portions with said first end having first latch engaging means along its top surface, said second end portion being connectable to the seat back at a pivot point spaced from the access of rotation;

a first latch mechanism receiving said first end portion of said first elongated rod and connected to said seat for latching said first elongated rod, said first latch mechanism supporting said first elongated rod for reciprocating movement relative to said structure and including first bias means for biasing said first elongated rod into a first direction to direct the seat back into an upright position;

first latch means complimentary to and engageable with said first latch engaging means on said first elongated rod for latching said first elongated rod when the seat back is at a desired tilt;

a first cam plate for camming said first latch means between a latched and unlatched position, said first cam plate being rotatably mounted to said first latch mechanism and driven in response to pressure applied by said operator;

first connection means for connecting said first cam plate and said first latch means, and second bias means for biasing said first cam plate into the latched position with said first elongated rod;

a second elongated rod spaced apart and parallel to said first elongated rod having first and second end portions with said first end having second latch engaging means along its top surface, said second end portion being connectable to the seat back at a pivot point spaced from the axis of rotation;

a second latch mechanism receiving said first end portion of said second elongated rod and connected to said seat for latching said second elongated rod, said second latch mechanism supporting said second elongated rod for reciprocating movement relative to said structure and including third bias means for biasing said second elongated rod into a first direction to direct the seat back into an upright position;

second latch means complimentary to and engageable with said second latch engaging means on said second elongated rod for latching said second elongated rod when the seat back is at a desired tilt;

a second cam plate for camming said second latch means between a latched and unlatched position, said second cam plate being rotatably mounted to said second latch mechanism;

a lever plate associated with said second latch mechanism and connected to said operator, said lever plate being driven in response to pressure applied by said operator;

second connection means for connecting said second cam plate and said second latch means, and fourth bias means for driving said second cam plate toward said lever plate so as to bias said second cam plate into the latched position with said second elongated rod; said second cam plate being rotatable independent of said operator such that said second latch means engages said second latch engaging means of said second elongated rod independently of said first cam plate; and means connecting said first and second latch mechanisms for transmitting torque from said first latch mechanism to said second latch mechanism, said torque being applied by said operator driving said first latch mechanism.

25. The latch mechanism as recited in claim 24 wherein said first and second latch engaging means comprise a rack of teeth provided along a top surface of said first and second elongated rods, respectively.

26. The latch mechanism as recited in claim 25 wherein said first and second latch means comprise first and second latch members respectively, each having at least one tooth complimentary to and engageable with said teeth on said elongated rods.

27. The latch mechanism as recited in claim 26 wherein said lever plate is constrained to rotate with said operator and said second cam plate, said second cam plate being freely rotatable relative to said operator, wherein rotation of said lever plate drives said second cam plate into an unlatched position such that said second latch member is disengaged from said second elongated rod, and wherein release of said operator resulting in said second latch member associated with said second cam plate engaging said second elongated rod independently of said first cam plate.

28. The seat structure as recited in claim 26 wherein said first and second connection means include a pin captivated within a slot such that said first and second cam plates are connected to said first and second latch members, respectively.

29. The seat structure as recited in claim 26 wherein said first and third bias means comprise an elongated coil spring extending along said first and second elongated rods respectively, and having one end engaging its corresponding latch mechanism and the other end engaging an abutment shoulder, said elongated coil springs encircling its corresponding elongated rod.

30. The seat structure as recited in claim 29 wherein said second and fourth bias means comprise a torsion spring disposed about a key associated with said operator and having one and the other of its ends engaging said first and second cam plates and said first and second latch mechanism, respectively, said torsion spring associated with said first cam plate resisting rotational movement of said first cam plate when said key is rotated and said torsion spring associated with said second cam driving said second cam plate into engagement with said lever plate.

31. The latch mechanism as recited in claim 26 wherein a pair of similar latch mechanisms are provided, one on each side of the seat with said second latch mechanism on the seat side spaced from a handle of said operator and including a lever plate constrained to rotated with said handle and a free-floating second cam plate, rotation of said lever plate driving said free-floating second cam plate into an unlatched position and said second latch member associated therewith from engagement with said second elongated rod, release of pressure on said handle resulting in said second latch member associated with said free-floating second cam plate engaging its rod independently of said first cam plate.

32. The seat structure as recited in claim 26 wherein said first latch mechanism comprises a pair of rotating cam plates a respective cam slot of each being aligned, each cam plate being mounted for rotation about an axis extending through said operator, said first latch member is disposed between said cam plates and is connected to said cam plates by a pin extending into each respective slot, rotation of said cam plates causing said first latch member to move in a plane perpendicular to said axis.

33. In an adjustable seat structure, a seat back pivoted to a seat bottom and a tilt adjusting mechanism for controlling rotation of the seat back relative to the seat bottom, said tilt adjusting mechanism comprising:

a master mechanism located on one side of said seat structure and including:
  a first master member connected to the seat bottom;
  a second master member connected to the seat back and moveable relative to said first master member in response to rotation of said seat back relative to said seat bottom;
  master engagement means for controlling the position of said second master member relative to said first master member and having an unengaged state wherein said second master member is free to move relative to said first master member and an engaged state wherein said second master member is restrained from moving relative to said first master member;
  manually actuable means operable by a user and connected to said master engagement means for controlling the state of said master engagement means; and
  first bias means for biasing said master engagement means toward its engaged state;

a slave mechanism located on the other side of said seat structure and including:
  a first slave member connected to the seat bottom;
  a second slave member connected to the seat back and moveable relative to said first slave member in response to rotation of said seat back relative to said seat bottom;
  slave engagement means for controlling the position of said second slave member relative to said first slave member and having an unengaged state wherein said second slave member is free to move relative to said first slave member and an engaged state wherein said second slave member is restrained from moving relative to said first slave member;
  second bias means for biasing said slave engagement
  means toward its engaged state; and drive linkage means connecting said master mechanism to said slave mechanism and responsive to movement of said master engagement means into its unengaged state for causing said slave engagement means to move into its unengaged state and permitting said slave engagement means to remain in its unengaged state after said master engagement means had returned to its engaged state.

34. The seat structure as recited in claim 33 wherein said first master member comprises a master latch mechanism, and said second master member comprising a master elongated rod having first latch engaging means at a first end and connected to said set back at its second end, said master latch mechanism receiving said first end of said master rod.

35. The seat structure as recited in claim 34 wherein said master engagement means comprises first latch means complimentary to and engageable with said first latch engaging means, a master cam plate connected to said first latch means and moveable with said actuable means for camming said first latch means between an unengaged and an engaged state and mounted to said master latch mechanism, and wherein said manually actuable means comprises an operator connected to said master cam plate for controlling the state between said first latch means and said first latch engaging means.

36. The seat structure as recited in claim 35 wherein said first slave member comprises a slave latch mechanism, and said second slave member comprises a slave-elongated rod having second latch engaging means at a first end and connected to said seat back at its second end, said slave latch mechanism receiving said first end of said second rod.

37. The seat structure as recited in claim 36 wherein said slave engagement means comprises second latch means complimentary to and engageable with said second latch engaging means, a slave cam plate connected to said slave latch mechanism and freely rotatable relative to said operator for camming said second latch means between and unengaged and engaged state, said slave cam plate connected to said second latch means, and a slave lever plate associated with said slave latch mechanism and connected to said operator.

38. The seat structure as recited in claim 37 wherein said drive linkage means is operably connected to said operator such that movement of said operator moves said slave lever plate into engagement with said slave cam plate to permit said second latch means to remain unengaged with said second latch engaging means after said first latch means engages said first latch engaging means.

* * * * *

UNITED STATES PATENT AND TRADEMARK OFFICE
CERTIFICATE OF CORRECTION

PATENT NO. : 4,898,424

DATED : February 6, 1990

INVENTOR(S) : Robert L. Bell

It is certified that error appears in the above-identified patent and that said Letters Patent is hereby corrected as shown below:

Title page, under "Inventor", "Rochester Hills, N.Y." should read
--Rochester Hills--.
Column 4, line 51, "camp" should be --cam--.

Column 12, lines 53 - 54, claim 33, after "engagement", insert --means toward its engaged state; and--.

Column 12, line 55, claim 33, delete "means toward its engaged state; and".

Signed and Sealed this

Second Day of April, 1991

Attest:

HARRY F. MANBECK, JR.

Attesting Officer

Commissioner of Patents and Trademarks